US009720992B2

(12) United States Patent
Lee et al.

(10) Patent No.: US 9,720,992 B2
(45) Date of Patent: Aug. 1, 2017

(54) DML REPLICATION WITH LOGICAL LOG SHIPPING

(71) Applicants: Joo Yeon Lee, Seoul (KR); Juchang Lee, Seoul (KR); Kyu Hwan Kim, Seoul (KR); Chul Won Lee, Seoul (KR); Yong Sik Kwon, Seoul (KR); Sang Kyun Cha, Seoul (KR)

(72) Inventors: Joo Yeon Lee, Seoul (KR); Juchang Lee, Seoul (KR); Kyu Hwan Kim, Seoul (KR); Chul Won Lee, Seoul (KR); Yong Sik Kwon, Seoul (KR); Sang Kyun Cha, Seoul (KR)

(73) Assignee: SAP SE, Walldorf (DE)

( * ) Notice: Subject to any disclaimer, the term of this patent is extended or adjusted under 35 U.S.C. 154(b) by 471 days.

(21) Appl. No.: 14/302,320

(22) Filed: Jun. 11, 2014

(65) Prior Publication Data
US 2015/0149409 A1 May 28, 2015

Related U.S. Application Data

(60) Provisional application No. 61/907,697, filed on Nov. 22, 2013.

(51) Int. Cl.
*G06F 17/30* (2006.01)
(52) U.S. Cl.
CPC .............................. *G06F 17/30575* (2013.01)
(58) Field of Classification Search
CPC ................................................ G06F 17/30575
See application file for complete search history.

(56) References Cited

U.S. PATENT DOCUMENTS

| 8,688,634 B2* | 4/2014 | Beyer et al. ...... G06F 17/30286 707/616 |
| 2001/0039586 A1* | 11/2001 | Primak et al. ...... H04L 67/1008 709/228 |
| 2005/0193041 A1* | 9/2005 | Bourbonnais et al. .................. G06F 17/30578 |
| 2009/0240739 A1* | 9/2009 | Bhatt et al. ............. G06F 9/526 |
| 2010/0030824 A1* | 2/2010 | Shang et al. ......... G06F 11/2097 707/E17.044 |
| 2013/0311426 A1* | 11/2013 | Erdogan; Ozgun Ali ................. G06F 17/30575 707/610 |

* cited by examiner

*Primary Examiner* — Albert Phillips, III
(74) *Attorney, Agent, or Firm* — Klarquist Sparkman, LLP

(57) ABSTRACT

Technologies are described for performing replication within a database environment. For example, replication of database data can be performed using data manipulation language (DML) statements and logical logs. A database node can execute a DML statement, create a logical log comprising the DML statement, and insert the logical log into a logical log queue. The logical log can be sent to one or more other database nodes for execution of the DML statement stored within the logical log. Logical logs can be grouped for sending to other nodes. Logical logs can be executed on a first node and one or more other nodes within the same transaction boundary. Execution of DML statements can be decoupled from sending, receiving, grouping, and/or processing of logical logs.

20 Claims, 6 Drawing Sheets

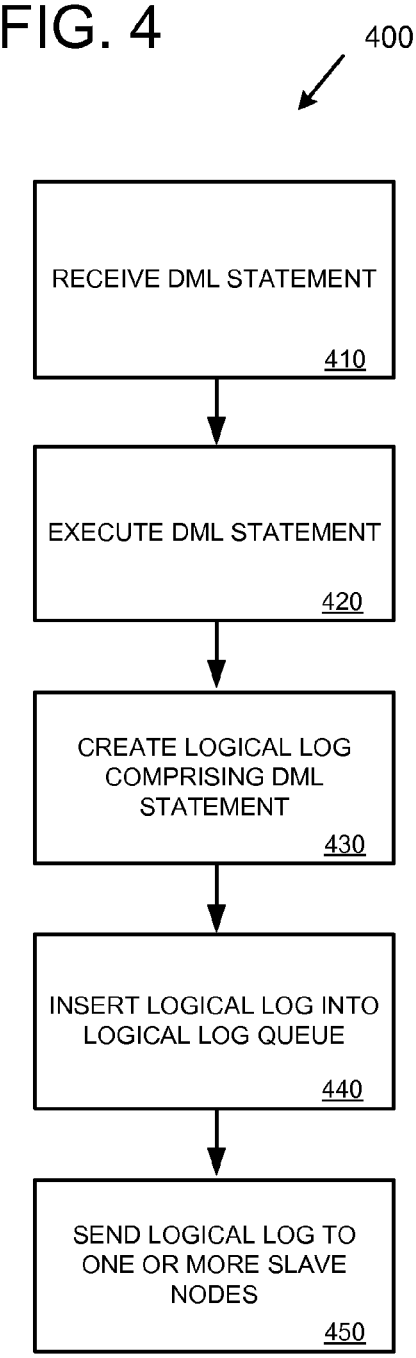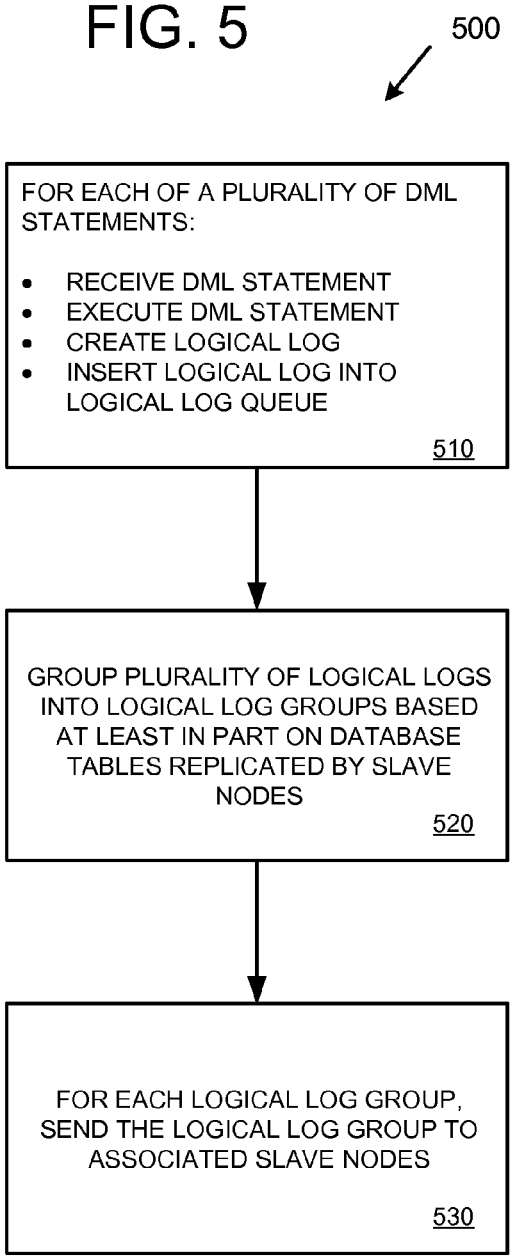

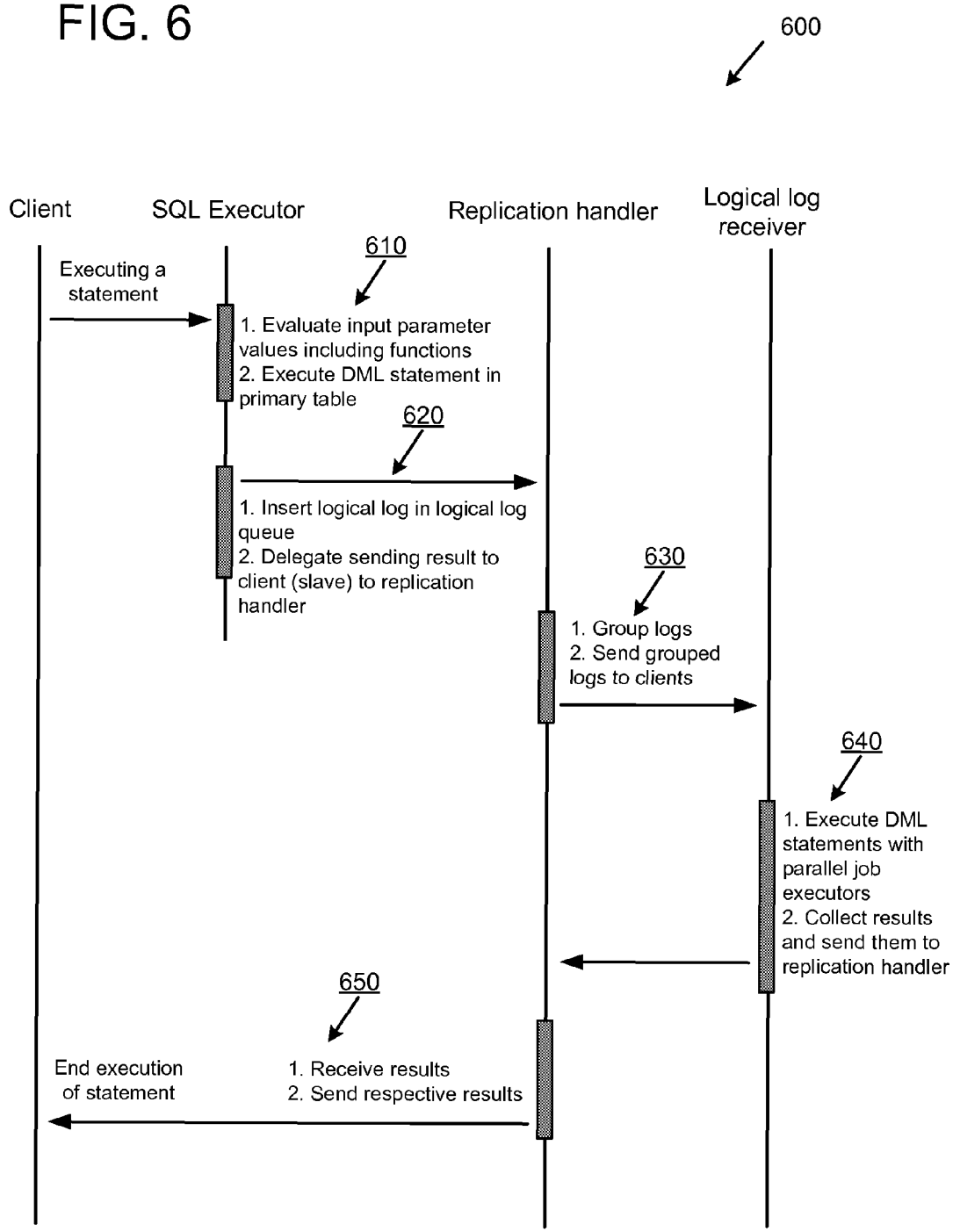

DML REPLICATION WITH LOGICAL LOG SHIPPING

BACKGROUND

Typically, database replication can be a complex task that requires significant computing resources, including processor resources and network resources. For example, in some database replication solutions, a database process may need to wait for confirmation that replication has completed before performing other tasks. In addition, replicating database information among database nodes can require significant additional network and communication resources as the number of nodes increases.

Therefore, there exists ample opportunity for improvement in technologies related to replication within database systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for performing replication (e.g., replication of database information as performed by insert, update, and/or delete database operations) using data manipulation language (DML) statements within a database environment. For example, DML-based replication of database data can be performed using DML statements and logical logs (e.g., by sending, or shipping, logical logs to slave nodes). A database node (e.g., a master node) can execute a DML statement, create a logical log comprising the DML statement, and insert the logical log into a logical log queue. The logical log can be sent to one or more other database nodes (e.g., to one or more slave nodes) for execution of the DML statement stored within the logical log. Logical logs can be grouped for sending to database nodes. Logical logs can be executed on multiple database nodes (e.g., on a master node and one or more slave nodes) within the same transaction boundary. Execution of DML statements can be decoupled from sending, receiving, grouping, and/or processing of logical logs.

As described herein, a variety of other features and advantages can be incorporated into the technologies as desired.

BRIEF DESCRIPTION OF THE DRAWINGS

FIG. 4 is a flowchart of an example method for performing replication within a database environment using DML statements and logical logs.

FIG. 5 is a flowchart of an example method for performing replication within a database environment, including logical log grouping.

FIG. 6 is a diagram depicting example operations performed during replication of database tables using DML statements and logical logs.

DETAILED DESCRIPTION

Example 1—Overview

Figure 1:
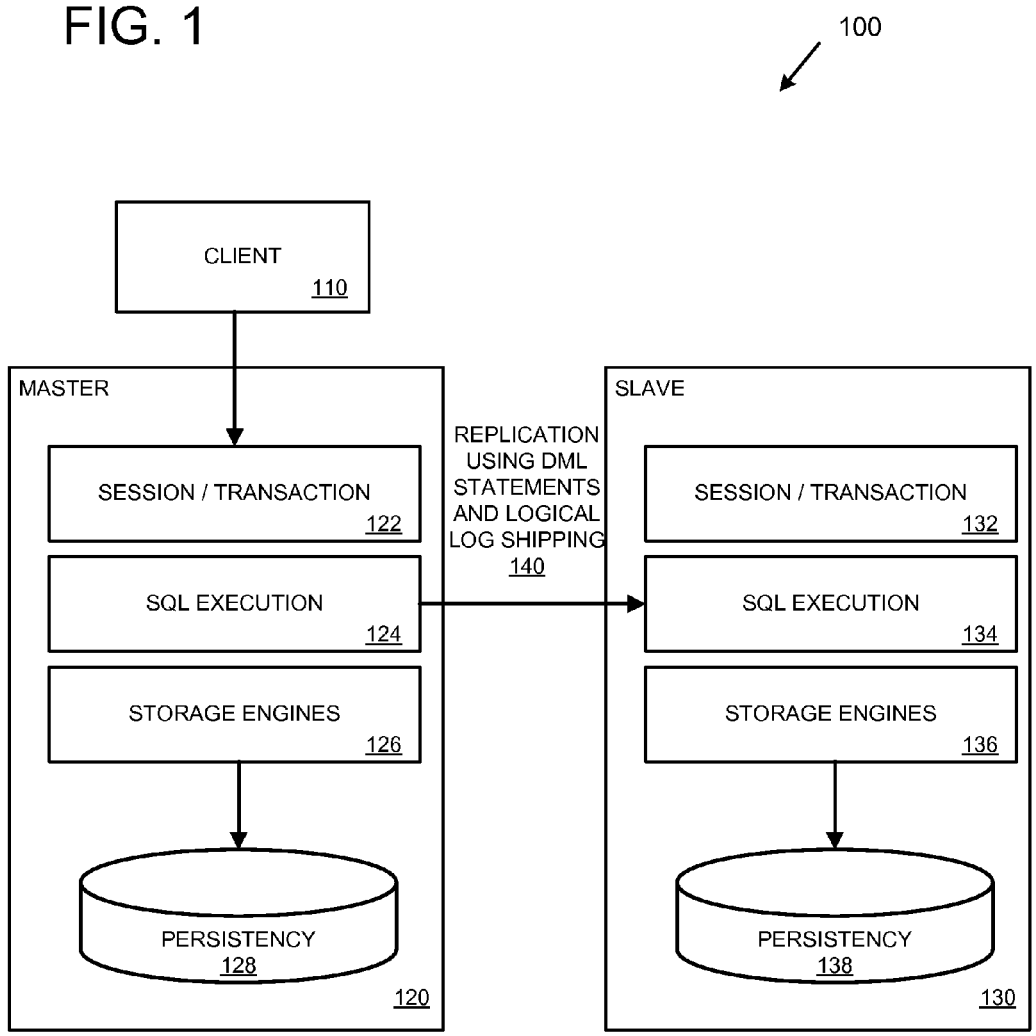
FIG. 1 is a diagram of an environment supporting replication using DML statements and logical log shipping.

The following description is directed to techniques and solutions for performing replication of data (e.g., database data). For example, efficient replication of database data can be performed using data manipulation (DML) statements and logical log shipping. In some implementations, DML statements are executed (e.g., at a first database system) and logical logs are created comprising the DML statements (e.g., a separate logical log for each DML statement). A logical log can include a DML statement and associated parameters and/or values (e.g., parameters and/or values that may be needed when the DML statement is executed at another database system). The logical logs can be inserted into a logical log queue and sent to one or more other database systems for execution. In this way, database data can be replicated between a first database system (e.g., a master node) and one or more other database systems (e.g., one or more slave nodes).

As used herein, a master node refers to a database system (e.g., one or more computing devices operating a database) from which database information (e.g., one or more database tables, an entire database, or other selection of database information) is replicated to other systems. As used herein, a slave node refers to a database system that replicates database information from a master node (e.g., replicates one or more database tables, an entire database, or other selection of database information).

Tables (e.g., database tables) can be replicated to multiple nodes (e.g., database nodes) in a scale-out system. This feature can provide scalable search throughput by leveraging multiple cores in multiple nodes beyond the limitation of a single machine. It can also reduce network traffic when joins are performed on multiple tables which are located on multiple nodes by providing more localized access.

However, a performance penalty can occur when DML statements are replicated in a synchronous manner (e.g., when a DML statement is executed on a master and one or more slaves within the same transaction in which execution on all nodes completes before the transaction is committed). In order to improve performance of replication using DML statements (e.g., synchronous replication using DML statements), various techniques can be applied including the use of logical logs and logical log grouping, decoupling DML execution and logical log management, thread decoupling, and/or other techniques described herein.

Example 2—Logical Logs

In any of the examples herein, DML statements (e.g., DML structured query language (SQL) statements) can be replicated using logical logs. For example, a logical log format can be created that comprises a DML statement with additional information associated with the DML statement (e.g., additional information for use when the DML statement is executed). In some implementations, a logical log comprises a single DML statement.

In some implementations, a logical log comprises a transaction identifier (ID), a DML statement, parameter values, and nondeterministic values. The transaction identifier identifies (e.g., uniquely identifies) the DML replication transaction. For example, the transaction identifier can uniquely identify the DML replication transaction that occurs on a master node and one or more slave nodes where the DML statement will be executed.

The DML statement is a statement used to modify (e.g., add, update, and/or delete) data. For example, the DML statement can be a SQL statement used to modify data in a database. In some implementations, the DML statement is a SQL insert, update, or delete statement (e.g., a single SQL insert, update, or delete statement).

Parameter values are values used by the DML statement. For example, the parameter values can be values for binding to variables in the DML statement (e.g., a prepared or precompiled DML SQL statement). When the DML statement is executed (e.g., replayed), bind variables can be replaced with their corresponding parameter values. For example, if a DML statement contains a variable "NAME", the variable can be replaced with a specific string value when the DML statement is executed (e.g., the variable "NAME" can be replaced with a specific value, such as "John").

Nondeterministic values refer to values that may be different between different computing devices (e.g., different between master nodes and slave nodes). For example, a timestamp function will return a current timestamp value when run on a master node, which will be a different timestamp value when run at a later time on a slave node. In implementations where the same value is to be used for such nondeterministic functions, the nondeterministic function can be evaluated once (e.g., on the master node) and the resulting value can be provided in the logical log to the slave node(s) so that when the DML statement is executed on the slave node(s) the same value will be used (the same value that was used at the master node). For example, the nondeterministic function (e.g., current timestamp function) can be evaluated at the master node during DML statement execution and the resulting value can be sent in a logical log to the slave node(s) for use when executing the DML statement at the slave node(s).

In some implementations, the logical log is the set of shipped values to perform replication of data at a replica location (e.g., a slave node) using a DML statement. In a specific implementation, the logical log consists of:
  Transaction ID
  DML SQL statement
  Parameter values: values of bind variables (labeled '?') in prepared statement
  Nondeterministic values: If SQL statement includes nondeterministic functions such as sequence or CURRENT_TIMESTAMP function, evaluated values of the nondeterministic functions are included.

Example 3—Environment Providing Replication Using DML Statements

In any of the examples herein, technologies can be provided for more efficient replication (e.g., replication of database information) using DML statements and logical logs. For example, DML statements can be executed at a master node and incorporated into logical logs for sending (shipping) to slave nodes for execution to replicate data between the master node and the slave nodes for one or more database tables.

In some implementations, the concept of DML replication (e.g., DML synchronous replication) with logical log shipping is intended to perform replication across multiple nodes with minimum replication overhead. Additionally, DML replication can be applied to different types of storage engines, such as row stores, column stores, etc.

FIG. 1 is a diagram 100 illustrating database data replication using DML statements and logical log shipping. As depicted in the diagram 100, a client 110 (e.g., a client computing device) communicates with a master node 120 (e.g., one or more server computers operating a database at which data will be modified and replicated to other nodes). For example, the client 110 can perform database manipulation operations (e.g., insert data, change data, and/or delete data in one or more database tables stored at the master node 120).

The master node 120 comprises a number of components, including a session/transaction component 122, a SQL execution component 124, and storage engines 126 (e.g., row-store and/or column-store storage engines). The storage engines 126 store database data in a persistency store 128 (e.g., hard disk drives, solid-state drives, and/or other types of persistent storage).

The master node 120 can receive data manipulation operations (e.g., operations to add, modify, and/or delete data, such as in the form of insert, update, and/or delete SQL statements) from the client 110 and/or from other clients or sources. Upon receiving the data manipulation operations (e.g., via the session/transaction component 122), the master node 120 can execute DML statements to perform the data manipulation operations (e.g., via the SQL execution component 124). The master node 120 can also create logical logs incorporating the DML statements and send them (as depicted at 140) to one or more slave nodes for execution, such as slave node 130.

The slave nodes can receive the logical logs and execute the DML statements contained within (e.g., along with other parameters, values, and/or other associated information in the logical logs). For example, slave node 130 can comprise components similar to the master node 120 (e.g., session/transaction component 132, SQL execution component 134, storage engines 136, and persistency store 138). The slave node 130 can replicate database information stored at the master node 120 (e.g., one or more database tables) via DML statements (e.g., so that database data changes at the master node 120 are replicated to the slave node 130). The slave node 130 can execute the DML statements and return results to the master node 120 (e.g., as part of a transaction that commits when the DML statement is executed successfully on both the master node 120 and the slave node 130, or rolls back the DML statement when execution is unsuccessful). Results can be provided to the master node 120 and/or to the client 110.

Figure 2:
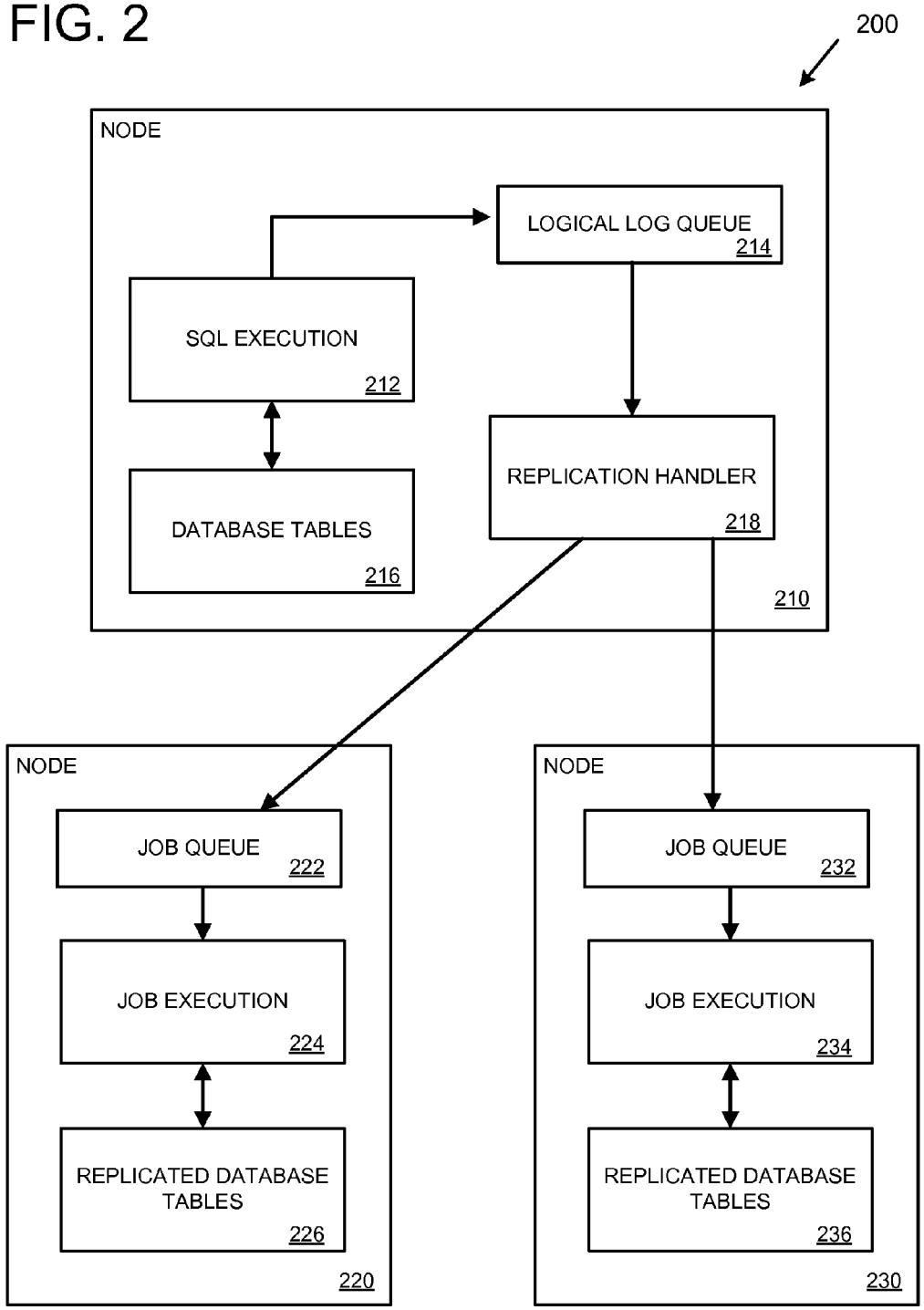
FIG. 2 is a diagram depicting a database environment for performing replication of database tables using DML statements and logical log shipping.

FIG. 2 is a diagram depicting an example database environment 200 for performing replication of database tables using DML statements and logical log shipping. The database environment 200 includes a number of nodes among which database tables are replicated.

As depicted in the database environment 200, a node 210 (e.g., a master node) comprises a number of components supporting database activity and replication. Specifically, the node 210 stores database tables 216 (e.g., in one or more persistent storage repositories). The node 210 includes a SQL execution component 212 that executes SQL statements that read and/or write database data in the database tables 216. The node 210 also includes a logical log queue 214 for storing logical logs and a replication handler 218 for sending logical logs to other database nodes (e.g., to nodes 220 and/or 230).

In order to replicate database tables (e.g., to replicate the database information stored in one or more database tables so that the database tables remain synchronized between database nodes), the SQL execution component 212 of the node 210 can receive a DML statement (e.g., from a user or from another source) and execute the DML statement on one of the database tables 216 (e.g., to add, modify, and/or delete data in the database table, which can be called a primary table). The SQL execution component 212 can then create a logical log comprising the DML statement and insert the logical log into the logical log queue 214. Once the logical log has been inserted into the logical log queue 214, the SQL execution component 212 can be free to handle other SQL requests (e.g., The SQL execution component 212 does not have to wait for the logical log to be replicated to the slave nodes before performing other SQL operations). In some implementations, the SQL execution component 212 comprises a number of threads of execution, where each thread can work independently to handle SQL requests. In such an implementation, a thread can execute a DML statement, create a logical log comprising the DML statement, insert the logical log into the logical log queue 214, and be free to handle other requests without having to wait for replication of the DML statement to be completed (e.g., for the DML statement to be sent to other nodes or for results of DML statement execution at the other nodes).

In some implementations, the SQL execution component 212 determines parameter values and/or nondeterministic values used by the DML statement when executing the DML statement in relation to the database table. In such implementations, the SQL execution component 212 can include the parameter values and/or nondeterministic values in the logical log with the DML statement. The SQL execution component 212 can also include a transaction identifier in the logical log to identify the replication transaction.

The node 210 also comprises a replication handler 218 for handling logical logs in the logical log queue 214. The replication handler 218 can take logical logs from the logical log queue 214 and send them to one or more slave nodes (e.g., node 220 and/or node 230) in order to perform replication by executing the DML statements contained within the logical logs. For example, the replication handler 218 can retrieve a logical log from the logical log queue 214 and send the logical log to node 220 and/or to node 230.

A node receiving a logical log, such as node 220, can receive the logical log and insert it into a job queue 222. Reception of the logical log by node 220 can be performed by a separate component (e.g., a logical log receiver component, not pictured) or by the job queue 222. Once the logical log has been received and inserted into the job queue 222, a job execution component 224 can retrieve the logical log and execute the DML statement contained within (e.g., along with parameter values and/or nondeterministic values, if present) on one of the replicated database tables 226. Other nodes can also receive the logical log from the replication handler 218 (e.g., node 230, with its own job queue 232, job execution component 234 and replicated database tables 236).

In some implementations, database tables can be replicated on a node-by-node basis. For example, a master node (e.g., node 210) can store a full set of database tables while a first slave node (e.g., node 220) may replicate some or all of the tables stored at the master node and a second slave node (e.g., node 230) may also replicate some or all of the tables stored at the master node. Furthermore, each slave node may replicate the same tables as one or more other slave nodes, or may replicate different tables from one or more other slave nodes. As an example, node 210 may store database tables 1, 2, and 3. Node 220 may replicate database tables 1 and 2. Node 230 may replicate database tables 1 and 3.

In some implementations, a logical log that contains a DML statement modifying a particular database table is sent to slave nodes that replicate the particular database table (e.g., only to those slave nodes that replicate the particular database table and not to slave nodes that do not replicate the particular database table). For example, the replication handler 218 can send a logical log from the logical log queue 214 to slave nodes that replicate a database table being modified by the DML statement within the logical log.

In some implementations, logical log grouping is performed. For example, multiple logical logs that modify database tables replicated at a particular slave node can be grouped and sent to the particular slave node. Consider an example arrangement in which node 210 stores store database tables 1, 2, and 3, node 220 replicates database tables 1 and 2, and node 230 replicates database tables 1 and 3. In this example arrangement, if the logical log queue 214 contains three logical logs that all modify database information stored in database table 1, then the three logical logs can be grouped (e.g., combined into a logical log group) and sent to both node 220 and node 230 which both replicate table 1. If the logical log queue 214 contains two logical logs that both modify database information stored in database table 3, then the two logical logs can be grouped and sent to node 230, which replicates database table 3 (and not to node 220, which does not replicate database table 3). If the logical log queue 214 contains two logical logs that both modify database information stored in database table 1 and one logical log that modifies database information stored in database table 2, then a first logical log group can be created for sending all three logical logs to node 220 and a second logical log group can be created for sending only the two logical logs that modify table 1 to node 230.

Logical log grouping can be applied so that network resources are utilized more efficiently. For example, to minimize the penalty of replication, logical log grouping can be used in which multiple logical logs for multiple clients are grouping into a single network communication. This technique can reduce network resource needed to perform replication and increase DML execution throughput.

The job execution component of a node that receives logical logs can comprise a number of processes or threads for executing jobs in the job queue. For example, the job execution component 224 of node 220 can include a number of job execution threads that retrieve logical logs from the job queue 222 and execute them. In some implementations, the job execution threads can execute logical logs in parallel, which can increase efficiency.

In some implementations, DML statements are executed on a master node and one or more slave nodes within the same transaction boundary (also called an execution boundary). For example, one or more DML statements can be associated with a transaction (e.g., identified by a transaction identifier). The one or more DML statements associated with the transaction can be executed at a master node, incorporated into logical logs and sent to one or more slave nodes, and executed at the slave nodes within the same transaction boundary. In some implementations, the DML statements are executed at the slave nodes within a sub-statement boundary of the overall transaction boundary.

In some implementations, DML statements within a transaction boundary can be rolled back. For example, a DML statement being executed on a master node and one or more slave nodes can be rolled back across the master and slave nodes (e.g., if execution at one of the nodes fails). In some implementations, partial rollback is supported in which one or more DML statements of a transaction can be rolled back independently of one or more other DML statements of the transaction. For example, if a transaction includes multiple DML statements, and one of the DML statements is rolled back on the master node, that DML statement can be rolled back on any slave nodes as well.

Execution of DML statements within a transaction boundary can provide for database consistency. For example, DML statements can be executed on a master node and one or more slave nodes and committed within the same transaction boundary (e.g., committed using an atomic commit operation).

In some implementations, thread decoupling is used to provide for more efficient replication. In some implementations, separate threads (e.g., dedicated handler threads) perform logical log shipping (e.g., operations including retrieving logical logs from the logical log queue, grouping, and/or sending to slave nodes). Using separate threads for logical log shipping and SQL execution can free up the SQL execution threads from having to perform logical log shipping operations (e.g., the SQL execution threads can be free to handle other SQL operations once they have placed logical logs into the logical log queue). For example, SQL execution threads can take pending DML jobs from other sources without having to wait for results of logical logs that have been sent to slave nodes.

Figure 3:
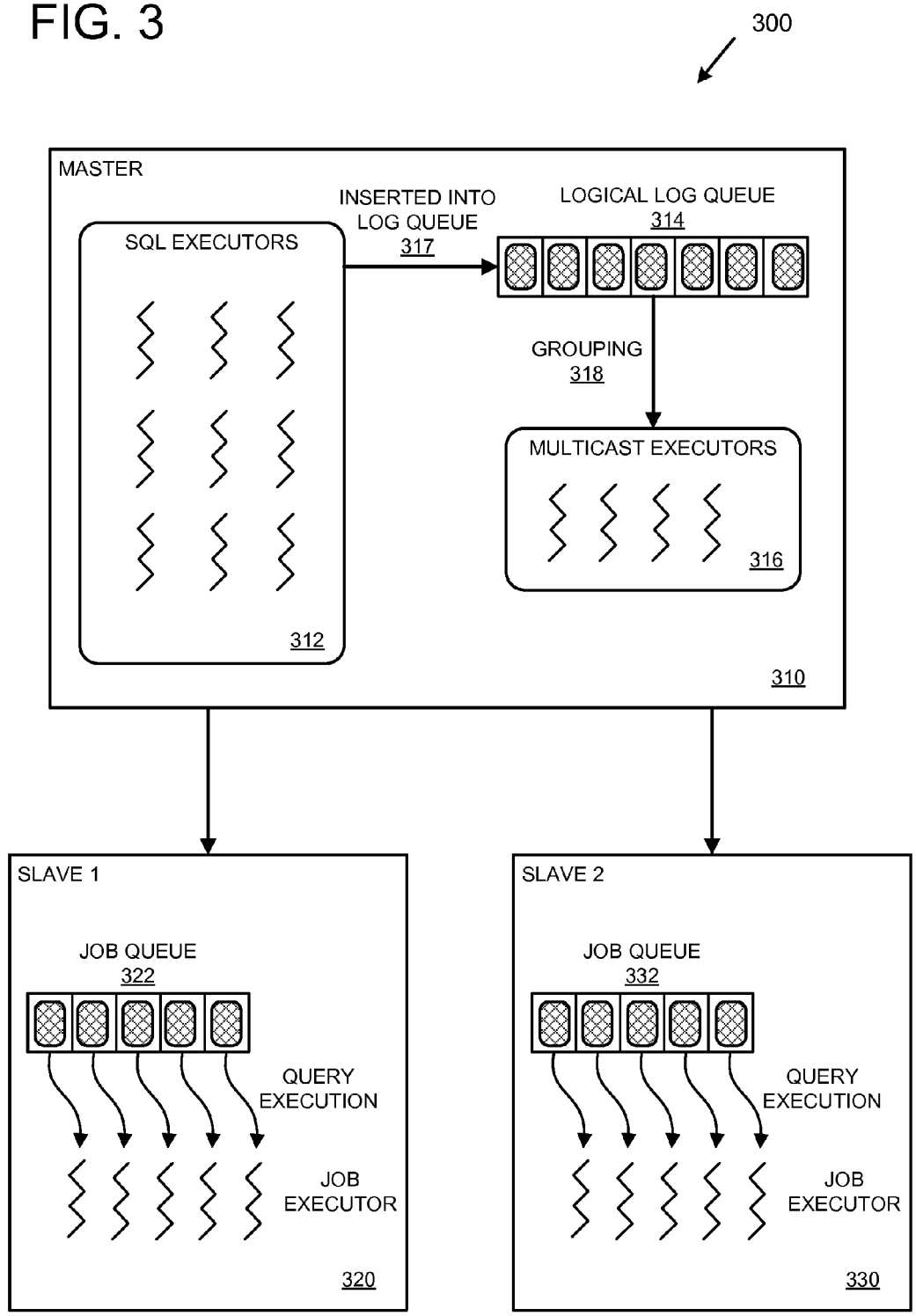
FIG. 3 is a diagram depicting a database environment for performing replication of database tables from a master node to slave nodes.

FIG. 3 is a diagram depicting a database environment 300 for performing replication of database tables from a master node 310 to slave nodes 320 and 330. While two slave nodes are depicted, replication of database tables can be performed between the master node 310 and any number of slave nodes.

As depicted in the example database environment 300, the master node includes a number of SQL executors 312 (threads of execution for handling SQL requests). To support replication, the SQL executors 312 receive DML statements, execute the DML statements (using database tables, not depicted), and insert logical logs (as depicted at 317) comprising the DML statements (and possibly additional information such as transaction IDs, parameter values, and nondeterministic values) into the logical log queue 314.

The multicast executors 316 (a separate set of threads of execution from the SQL executors 312) retrieve logical logs from the logical log queue 314 and perform grouping (as depicted at 318). The multicast executors 316 then send the groups of logical logs to the slave nodes (e.g., slave nodes 320 and 330) for execution of the DML statements contained within the logical logs.

The slave nodes execute the logical logs received from the master node 310. As depicted, each slave node has a job queue (e.g., 322 and 332) for storing logical logs received by the slave node. Each slave node also includes a number of job executor threads for executing (e.g., in parallel) the DML statements in the logical logs retrieved from the job queue.

Because each slave node can replicate one or more database tables independently of other slave nodes, in some implementations each slave node only receives and executes logical logs for database tables replicated by the slave node.

FIG. 4 is a flowchart of an example method 400 for performing replication within a database environment using data manipulation language (DML) statements and logical logs. The example method 400 can be performed by a database node, such as node 120, node 210, or node 310, which in some implementations is called a master node. At 410, a DML statement is received. For example, the DML statement can be received from a client device (e.g., by way of a database user initiating a SQL operation) or from another source.

At 420, the DML statement is executed. For example, the DML statement can be executed by a master node to insert, update, or delete data in a database table (e.g., a primary database table).

At 430, a logical log is created comprising the DML statement. The logical log can comprise the DML statement, a transaction identifier, parameter values, and/or nondeterministic values.

At 440, the logical log is inserted into a logical log queue. For example, a SQL process or thread running on the master node can execute the DML statement, create the logical log, and insert the created logical log into the logical log queue for handling by other processes or threads so that the SQL process or thread is free to handle other requests.

At 450, the logical log is sent to one or more slave nodes. The one or more slave nodes can receive the logical log and put it into a job queue for processing. The one or more slaves can then retrieve the logical log from the job queue and execute the DML statement contained within. When sending the logical log to the one or more slave nodes, grouping can be performed so that the logical log is grouped with other logical logs in the logical log queue for sending to the one or more slave nodes (e.g., logical logs that modify data in tables replicated by the one or more slave nodes).

FIG. 5 is a flowchart of an example method 500 for performing replication within a database environment us including logical log grouping. The example method 500 can be performed by a database node, such as node 120, node 210, or node 310, which in some implementations is called a master node. At 510, a number of operations are performed for each of a plurality of DML statements. The operations comprise: receiving the DML statement, executing the DML statement, creating a logical log comprising the DML statement, and inserting the logical log into a logical log queue.

At 520, logical logs in the logical log queue are grouped into logical log groups based at least in part on database tables replicated by slave nodes. For example, those logical logs in the logical log queue that will be executed on a particular database table can be selected and grouped for sending to those slave nodes that replicate the particular database table. In some implementations, a logical log group comprises one or more logical logs associated with a particular database table.

At 530, each logical log group is sent to the slave nodes associated with the logical log group (e.g., to one or more slave nodes that replicate database tables upon which the DML statements will be executed).

FIG. 6 is a diagram depicting example operations 600 performed during replication of database tables using DML statements and logical logs. As depicted, a client initiates execution of a SQL DML statement. The DML statement is executed by a SQL executor thread in a primary database table, including evaluation of input parameter values and nondeterministic function values, as depicted at 610. The SQL executor thread then inserts a logical log into the logical log queue, as depicted at 620. The replication handler groups logical logs from the logical log queue and sends them to slave nodes, as depicted at 630. The logical logs are received by logical log receivers at the slave nodes and executed by job executor threads, as depicted at 640, and results of the execution (e.g., results of successful execution, execution errors indicating rollback or partial rollback, and/or other results) are sent back to the replication handler. Results are also returned to the client, as depicted at 650.

Example 4—Computing Systems

Figure 7:
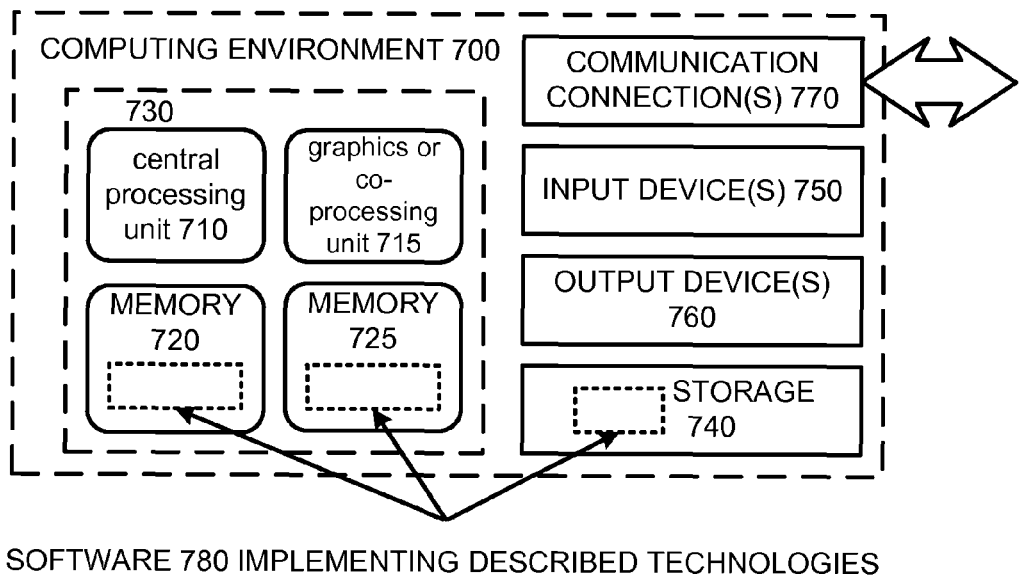
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 5—Cloud Computing Environment

Figure 8:
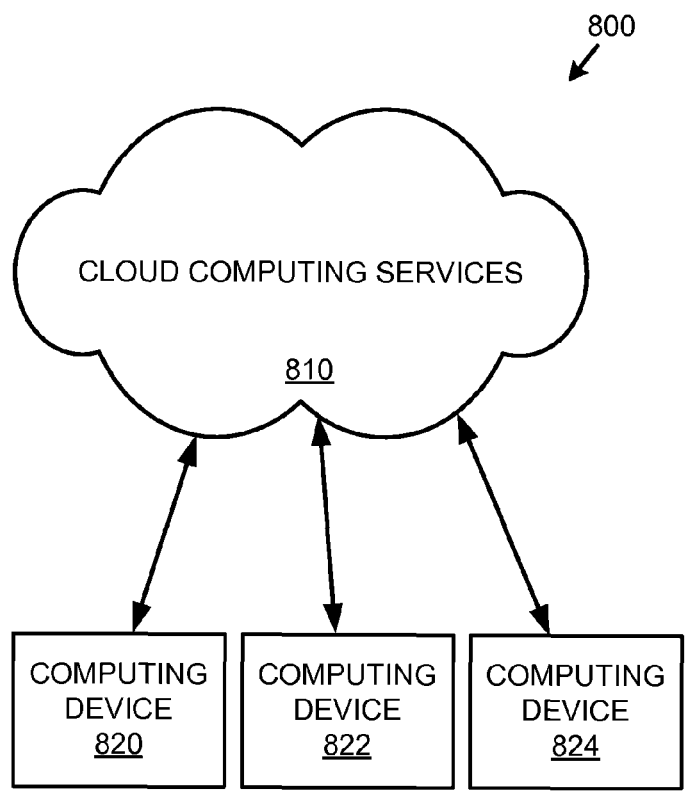
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example 6—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by a master node comprising a processing unit and memory, for performing replication within a database environment using data manipulation language (DML) statements and logical logs, the method comprising:
   receiving a DML statement;
   executing the DML statement at the master node;
   creating a logical log comprising the DML statement;
   inserting the logical log into a logical log queue; and
   sending the logical log, retrieved from the logical log queue, to at least one slave node for execution of the DML statement at the at least one slave node;
   wherein a first thread, executing separately from a second thread, performs logical log shipping, wherein the logical log shipping comprises at least one of: retrieving logical logs from the logical log queue, grouping, or sending to slave nodes; and
   wherein the second thread performs the executing operation but does not perform the logical log shipping.

2. The method of claim 1, wherein executing the DML statement at the master node comprises:
   obtaining parameter values used by the DML statement; and
   evaluating nondeterministic functions used by the DML statement to obtain nondeterministic values.

3. The method of claim 1, the logical log further comprising:
   a transaction identifier;
   parameter values used by the DML statement; and
   nondeterministic values used by the DML statement.

4. The method of claim 1, wherein executing the DML statement at the master node is performed within a transaction boundary, and wherein the execution of the DML statement at the at least one slave node is performed within the transaction boundary.

5. The method of claim 4, wherein execution of the DML statement at the master node and at the at least one slave node within the transaction boundary supports rollback of the DML statement at the master node and the at least one slave node.

6. The method of claim 1, wherein execution of the DML statement at the master node is performed by a structured query language (SQL) executor thread, and wherein sending the logical log to the at least one slave node is performed by a replication handler thread.

7. The method of claim 1, further comprising:
   grouping the logical log with other logical logs in the logical log queue for sending to the at least one slave node.

8. The method of claim 7, wherein the logical log and the other logical logs in the logical log queue are grouped based at least in part on which database tables are replicated at the at least one slave node.

9. A computer-readable storage medium storing computer-executable instructions for causing a computing device to execute a method for performing replication within a database environment using structured query language (SQL) statements and logical logs, the method comprising:
   for each of a plurality of SQL statements:

receiving the SQL statement;
executing the SQL statement;
creating a logical log comprising the SQL statement; and
inserting the logical log into a logical log queue;
grouping the plurality of logical logs in the logical log queue into one or more logical log groups based at least in part upon database tables replicated by each of a plurality of slave nodes;
wherein first and second logical logs of the plurality of logical logs comprise respective first and second SQL statements directed to different respective first and second database tables replicated by a first slave node of the plurality of slave nodes, and the first and second logical logs are grouped together into a first logical log group of the one or more logical log groups; and
for each of the logical log groups, sending the logical log group to one or more slave nodes, of the plurality of slave nodes, that are associated with the logical log group for execution of the SQL statements in the logical log group.

10. The computer-readable storage medium of claim 9 wherein each logical log in the logical log queue that modifies the first database table is grouped together in the first logical log group and sent to each slave node that replaeicates the first database table.

11. The computer-readable storage medium of claim 9 wherein:
each logical log in the logical log queue that modifies the first database table is grouped together in the first logical log group;
the plurality of slave nodes comprises a first set of at least one slave node and a second set of at least one slave node;
each slave node of the first set is associated with the first logical group and replicates the first database table;
each slave node of the second set is not associated with the first logical group and does not replicate the first database table, and
the first logical log group is not sent to the at least one slave node of the second set.

12. The computer-readable storage medium of claim 9 wherein a first slave node replicates the first database table, wherein a second slave node replicates the second database table but does not replicate the first database table, wherein logical logs in the logical log queue that have SQL statements modifying the first database table are grouped together for sending to the first slave node but not to the second slave node, and wherein logical logs in the logical log queue that have SQL statements modifying the second database table are grouped together for sending to the second slave node.

13. The computer-readable storage medium of claim 9, wherein a first thread, executing separately from a second thread, performs logical log shipping, wherein the logical log shipping comprises at least one of: retrieving logical logs from the logical log queue, grouping, or sending to slave nodes; and
wherein the second thread performs the executing operation but does not perform the logical log shipping.

14. A database environment comprising:
a master node; and
a plurality of slave nodes;
the database environment configured to perform operations for replicating database information using structured query language (SQL) statements and logical logs, the operations comprising:
at the master node:
receiving a SQL statement;
executing the SQL statement;
creating a logical log comprising the SQL statement;
inserting the logical log into a logical log queue;
grouping the logical log with other logical logs in the logical log queue for sending to at least one slave node of the plurality of slave nodes; and
sending the logical log from the logical log queue to the at least one slave node of the plurality of slave nodes for execution of the SQL statement at the at least one slave node; and
by the at least one slave node:
receiving the logical log; and
executing the DML SQL statement contained in the logical log;
wherein the logical log and the other logical logs in the logical log queue are grouped based at least in part on which database tables are replicated at the at least one slave node;
wherein first and second logical logs of a first group of logical logs comprise respective first and second SQL statements directed to different respective first and second database tables replicated by a first slave node of the at least one slave node.

15. The database environment of claim 14, wherein executing the SQL statement at the master node comprises:
obtaining parameter values used by the SQL statement; and
evaluating nondeterministic functions used by the SQL statement to obtain nondeterministic values.

16. The database environment of claim 14, the logical log further comprising:
a transaction identifier;
parameter values used by the SQL statement; and
nondeterministic values used by the SQL statement.

17. The database environment of claim 14, wherein executing the SQL statement at the master node is performed within a transaction boundary associated with a transaction, wherein the execution of the SQL statement at the at least one slave node is performed within the transaction boundary, and wherein partial rollback of the SQL statement is supported by the transaction at the master node and at the at least one slave node.

18. The database environment of claim 14, wherein a first thread executing at the master node executes the SQL statement, creates the logical log, and inserts the logical log into the logical log queue, wherein a second thread, executing at the master node separately from the first thread, sends the logical log to the at least one slave node, and wherein the first thread is free to perform other operations after inserting the logical log into the logical log queue.

19. The database environment of claim 14, further comprising sending the first logical log group to the first slave node but not to a second slave node;
wherein the second slave node replicates the first database table but does not replicate the second database table.

20. The database environment of claim 14, wherein the operations by the at least one slave node further comprise providing a result of a slave node executed operation to the master node.

* * * * *